United States Patent
Roberts et al.

(10) Patent No.: US 8,924,399 B1
(45) Date of Patent: Dec. 30, 2014

(54) FLEXIBLE PAGE-VIEWING WITHIN A BROWSER TAB

(75) Inventors: Teresa Lynn Roberts, Palo Alto, CA (US); Victoria Dolginsky, Los Gatos, CA (US); Syed Yousuf Haider, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 313 days.

(21) Appl. No.: 13/460,559

(22) Filed: Apr. 30, 2012

(51) Int. Cl.
*G06F 17/00* (2006.01)

(52) U.S. Cl.
USPC .......... 707/754; 715/205; 715/777; 715/825; 715/826

(58) Field of Classification Search
CPC ............................................. G06F 17/30876
See application file for complete search history.

(56) References Cited

U.S. PATENT DOCUMENTS

| | | | |
|---|---|---|---|
| 7,167,901 B1 * | 1/2007 | Beadle et al. | 709/207 |
| 7,640,496 B1 * | 12/2009 | Chaulk et al. | 715/243 |
| 2001/0049704 A1 * | 12/2001 | Hamburg et al. | 707/530 |
| 2009/0327174 A1 * | 12/2009 | Honkala | 706/12 |
| 2010/0005053 A1 * | 1/2010 | Estes | 707/1 |
| 2010/0123938 A1 * | 5/2010 | Sunami | 358/1.18 |
| 2010/0131869 A1 * | 5/2010 | Adachi et al. | 715/760 |
| 2013/0246238 A1 * | 9/2013 | Chen et al. | 705/37 |

* cited by examiner

*Primary Examiner* — Stephen Hong
*Assistant Examiner* — Keith Bloomquist
(74) *Attorney, Agent, or Firm* — Osha • Liang LLP

(57) ABSTRACT

A system comprising a client application configured to receive input targeting an identifier of a first page history entry, and obtain, from a client-side memory, the first page history entry and generate a second page history entry comprising a second resource location and a second client-side parameter. The client application is further configured to store the second page history entry in the client-side memory and send, to a server application, a request comprising the first resource location retrieved from the first page history entry. The client application is further configured to receive first resource data from the server application in response to the request, apply the client-side parameter to the first resource data to obtain reformed first resource data, and generate a second page comprising the reformed first resource data and the page history list listing an identifier of the second page history entry.

20 Claims, 13 Drawing Sheets

FLEXIBLE PAGE-VIEWING WITHIN A BROWSER TAB

BACKGROUND

Modern Internet browsers maintain a list of websites visited by users. Often, each entry of the list includes the network location of the visited page. Increasingly, however, Internet browsers are used to access and host dynamic applications provided by webservers. Such applications may allow a user to interact and customize the data and application interface presented using the Internet browser.

SUMMARY

In general, in one aspect, the invention relates to a system comprising a client-side storage, a processor, and a client application. The client-side storage is configured to store a first page history entry comprising a first resource location and a first client-side parameter. The client application is configured to display, to a user, a first page comprising a second resource location, a second client-side parameter, and a page history list listing an identifier of the first page history entry, and receive, from the user, input targeting the identifier of the first page history entry. The client application is further configured to obtain, from the client-side memory, the first page history entry corresponding to the identifier and generate a second page history entry comprising the second resource location and the second client-side parameter. The client application is further configured to store the second page history entry in the client-side memory and send, to a server application, a request comprising the first resource location retrieved from the first page history entry. The client application is further configured to receive first resource data from the server application in response to the request, apply the client-side parameter to the first resource data to obtain reformed first resource data, and generate a second page comprising the reformed first resource data and the page history list listing an identifier of the second page history entry.

In general, in one aspect, the invention relates to a method for tracking a navigation path. The method comprises displaying, by a client application executing on a processor, a first page comprising a first resource location, a first client-side parameter, and a page history list listing an identifier of a first page history entry, receiving, by the client application executing on the processor, input targeting the identifier of the first page history entry, and obtaining, from a page history list, the first page history entry corresponding to the identifier. The method further comprises generating, by the client application executing on the processor, a second page history entry comprising the first resource location and the first client-side parameter, storing the second page history entry in the page history list, and sending, to a server application, a request comprising the second resource location retrieved from the first page history entry. The method further comprises receiving, by the client application executing on the processor, resource data from the server application in response to the request, applying the second client-side parameter to the resource data to obtain reformed resource data, and generating, by the client application executing on the processor, a second page comprising the reformed resource data and the page history list listing an identifier of the second page history entry.

In general, in one aspect, the invention relates to computer-readable storage medium comprising instructions that, when executed by a processor, perform displaying, by a client application executing on a processor, a first page comprising a first resource location, a first client-side parameter, and a page history list listing an identifier of a first page history entry, receiving, by the client application executing on the processor, input targeting the identifier of the first page history entry, and obtaining, from a page history list, the first page history entry corresponding to the identifier. The instructions further perform generating, by the client application executing on the processor, a second page history entry comprising the first resource location and the first client-side parameter, storing the second page history entry in the page history list, and sending, to a server application, a request comprising the second resource location retrieved from the first page history entry. The instructions further perform receiving, by the client application executing on the processor, resource data from the server application in response to the request, applying the second client-side parameter to the resource data to obtain reformed resource data, and generating, by the client application executing on the processor, a second page comprising the reformed resource data and the page history list listing an identifier of the second page history entry.

DETAILED DESCRIPTION

Figure 1:
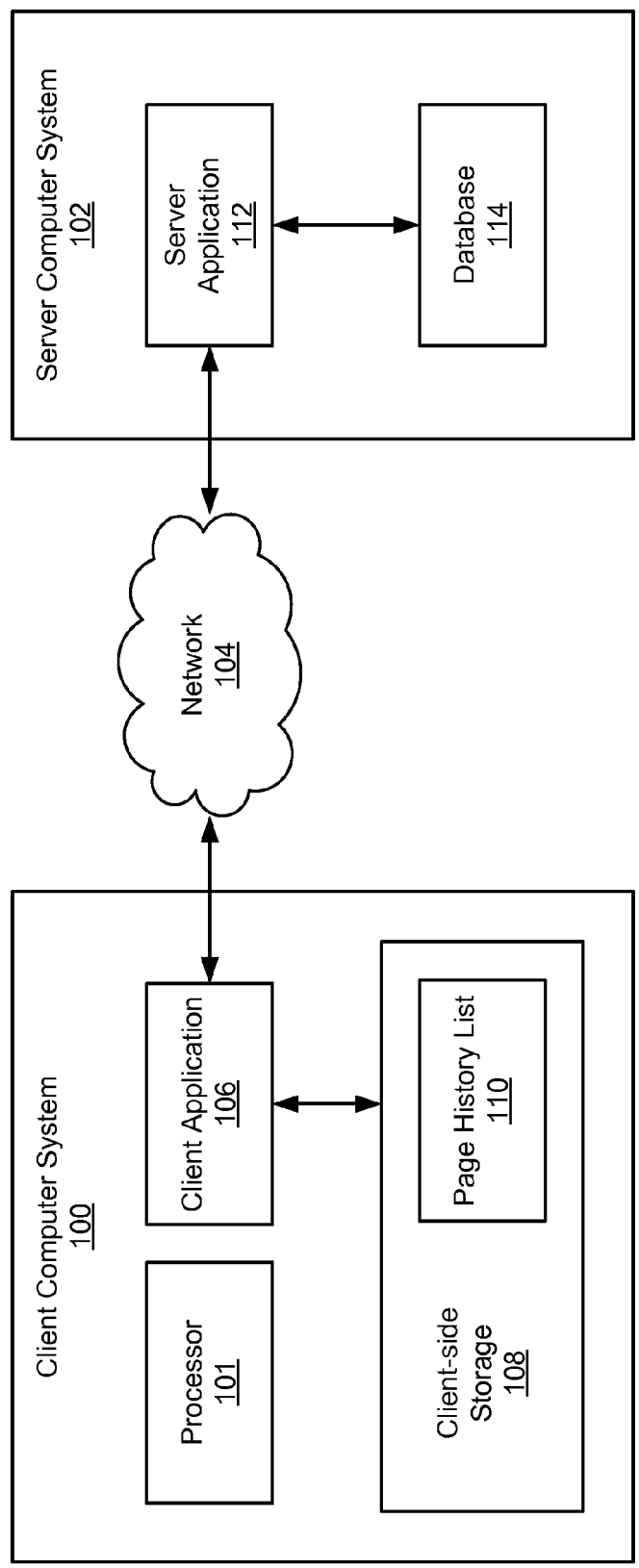
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for maintaining the state of an application page customized by a user. Specifically, the invention relates to capturing the changes and customizations to a page on a networked application such that the page may be restored to the same state at a later time. Embodiments of the invention also relate to generating a record of pages accessed by a user in the chronological order in which they were accessed.

FIG. 1 shows a diagram of a system in accordance with one or more embodiments of the invention. As shown in FIG. 1, the system includes a client computer system (100) connected to a server computer system (102) via a network (104). The client computer system (100) includes a processor (101), a client application (106) and client-side storage (108). The client-side storage (108) includes a page history list (110). The server computer system (102) includes a server application (112) and a database (114). Each of the elements is described below.

In one or more embodiments of the invention, the client computer system (100) is any computer device with a processor (101) used to execute a client application (106). The client computer system (100) may be a desktop computing system or portable computing system such as a laptop computer, smartphone, tablet computer, or personal digital assistant. In one embodiment of the invention, the client computer system (100) may be a thin client that includes only the necessary hardware to accept user input and to display a user interface. In one embodiment of the invention, the processing for the client application (106) is performed by a separate computer system (not shown) or the server computer system (102).

In one embodiment of the invention, the client application (106) is a program designed to provide an interface between the client computer system (100) and the server application (112). In one embodiment of the invention, the client application (106) is used to request data from the server application (112). In one embodiment of the invention, the requested data is stored in the database (114) and accessed by the server application (112) in response to a request for that data. For example, client application (106) may be implemented as an Internet browser, server application (112) may be implemented as a web server, and the requested data stored on the database (114) may be implemented as a hypertext markup language (HTML) file.

In one or more embodiments of the invention, client application (106) is a software platform for executing specialty purpose applications. Such specialty purpose applications may be provided in part or in whole by the server application (112). In one or more embodiments of the invention, the specialty purpose application is a financial application used to access financial data hosted by a server application. In one or more embodiments of the invention, specialty applications executing via the client application (106) may access computing resources on the client computing system (100), such as client-side storage (108).

In one or more embodiments of the invention, client-side storage (108) corresponds to client-side computer memory on the client computing system (100). In one embodiment of the invention, client-side storage (108) may be a portion of random access memory or persistent storage on the client computer system (100) allocated for use by client application (106). In one or more embodiments of the invention, client-side storage (108) may correspond to an iframe of an Internet browser.

In one or more embodiments of the invention, access to computing resources, such as client-side storage (108), may be controlled by the client application (106). For example, client application (106) may be executing a specialty program for rendering 3D environments using 3D graphic files provided by the server application (112). In this example, the 3D rendering program may request access to a graphics processing unit on the client computer system (100) from the client application (106). The client application (106) may then determine whether or not the specialty program should be allowed access to the resource.

In one or more embodiments of the invention, the client application may store a page history list (110) on the client-side storage (108), which is described below with reference to FIG. 2.

Figure 2:
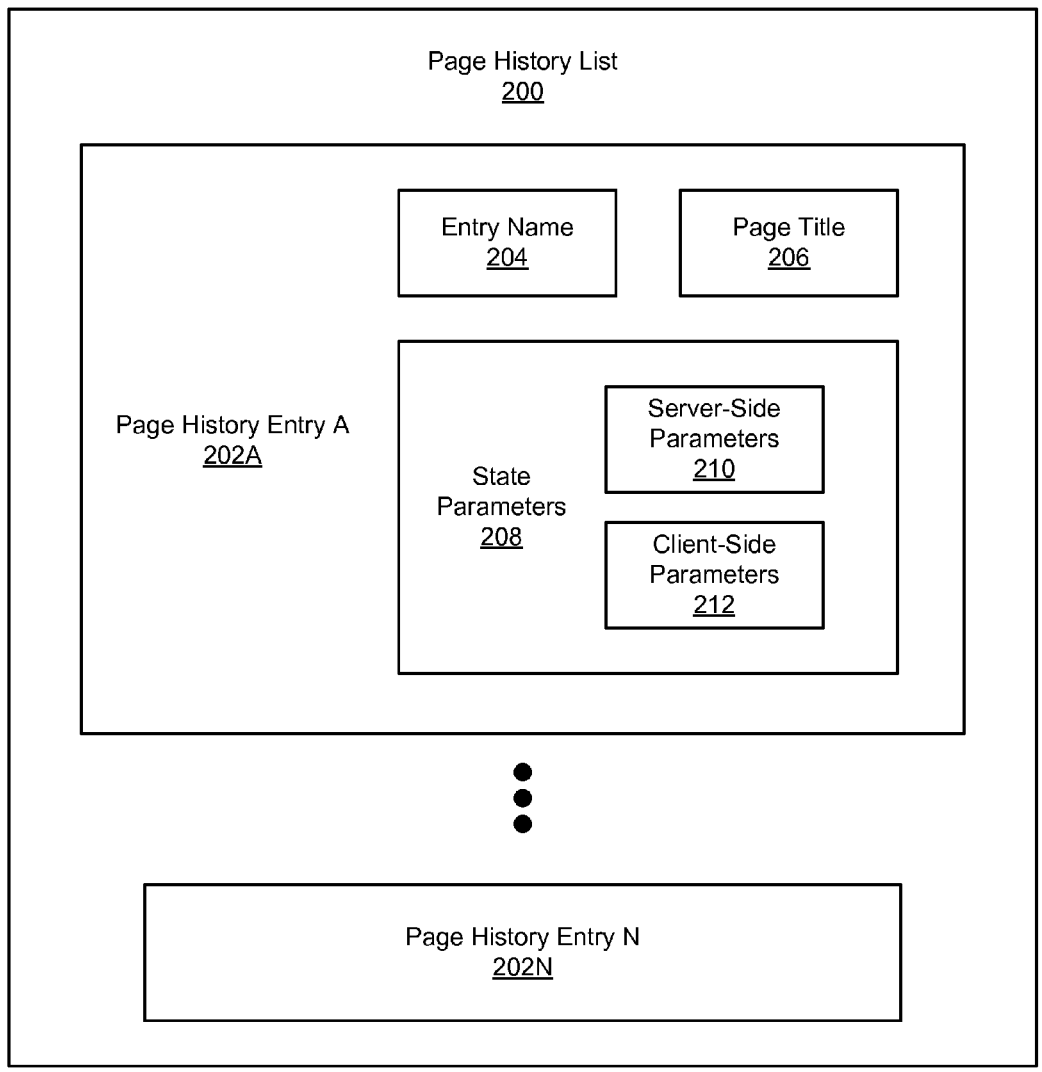
FIG. 2 shows system in accordance with one or more embodiments of the invention.

FIG. 2 shows a page history list in accordance with one or more embodiments of the invention. As shown in FIG. 2, the page history list (200) includes multiple page history entries (page history entry A (202A), page history entry N (202N)). Each page history entry, such as page history entry A (202A), includes an entry name (204), a page title (206), and state parameters (208). The state parameters (208) include server-side parameters (210) and client-side parameters (212). Each of the elements is described below.

In one or more embodiments of the invention, the page history entry (202A) is created when a user exits one page on the client application in order to load a separate page on the client application. In one embodiment of the invention, the page history entry (202A) stores any changes or customizations a user makes to a page in the client application. An identifier for the page history entry, such as the entry name (204), may be presented to the user providing the ability to return to the page and restore changes to the page previously made by the user.

In one or more embodiments of the invention, the entry name (204) is an identifier of the page history entry (202A) used to distinguish one page history entry (202A) in the page history list (200) from another page history entry (202N). In one embodiment of the invention, the entry name (204) is generated using a combination of the page title (206), the server-side parameters (210), and the client-side parameters (212).

In one or more embodiments of the invention, the page title (206) is the title of the page as presented to a user of the client computer system. The page title (206) may be an element of the code retrieved from the server application (e.g., the title in an HTML file). The page title (206) may be a generic designation of a page used by the client application when displaying the associated page.

In one or more embodiments of the invention, the state parameters (208) correspond to the static and dynamic data used to render a page on the client application. The state parameters (208) include server-side parameters (210) and client-side parameters (212). In one embodiment of the invention, parameters sent to the server computing system in a request for a page are stored in the server-side parameters (210). Examples of server-side parameters (210) include uniform resource locators (URLs), search terms for a search of the database, and instructions indicating the format of the response (e.g., that the returned page display only the first 10 search matches).

In one embodiment of the invention, parameters applied by the client application to the data received by the server application are stored in the client-side parameters (212). Examples of client-side parameters (212) include instructions to filter the returned data, the terms by which the data is to be filtered, and sorting instructions.

Figure 3:
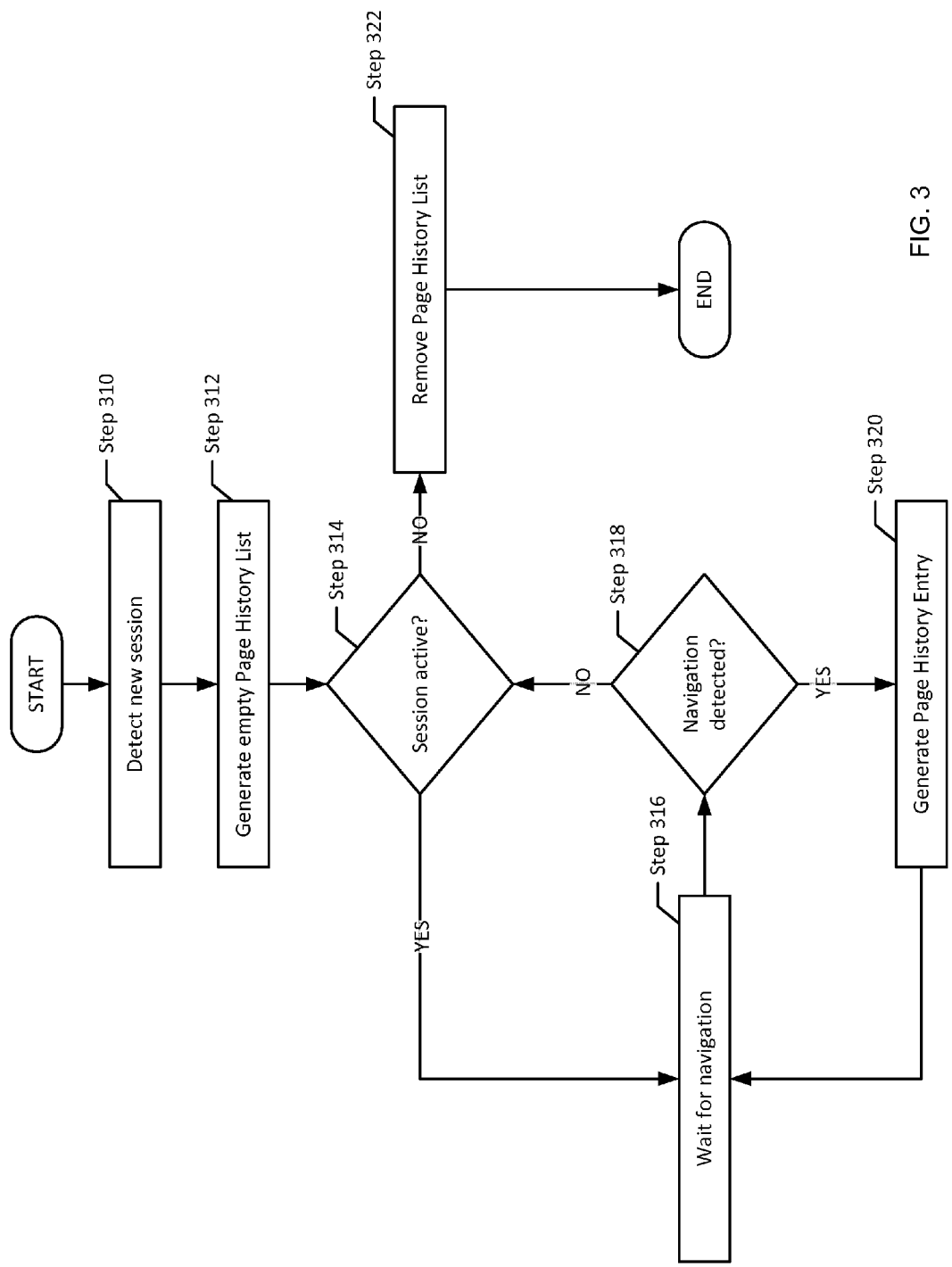
FIG. 3 shows a flow diagram in accordance with one or more embodiments of the invention.

FIG. 3 shows a flowchart for initializing a page history list in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 310, the client application detects that a new session between the client application and the server application has started. In Step 312, the client application creates a page history list without any page history entries. In one or more embodiments of the invention, the page history list (200) is implemented as a linked list data structure, and an empty page history list is generated with a null page history entry as a dummy node.

In Step 314, the client application determines whether the session detected in Step 310 is still active. If in Step 314, the session is still active, then in Step 316, the client application waits for an indication that the user has navigated to a new page. In Step 318, the client application determines whether a navigation indicator has been received. Further detail regarding Step 318 is provided below with reference to FIGS. 5 and 6. If in Step 318, the client application determines that a navigation indicator has been received, then in Step 320, a new page history entry is generated and the process waits for a subsequent navigation indicator in Step 316. Further detail regarding Step 320 is provided below with reference to FIG. 4.

If in Step 318, the client application determines that no navigation has been detected, then the process returns to Step 314, and the client application determines whether the session is still active. If in Step 314, the client application determines that the session is no longer active, then in Step 322, the client application removes the page history list.

Figure 4:
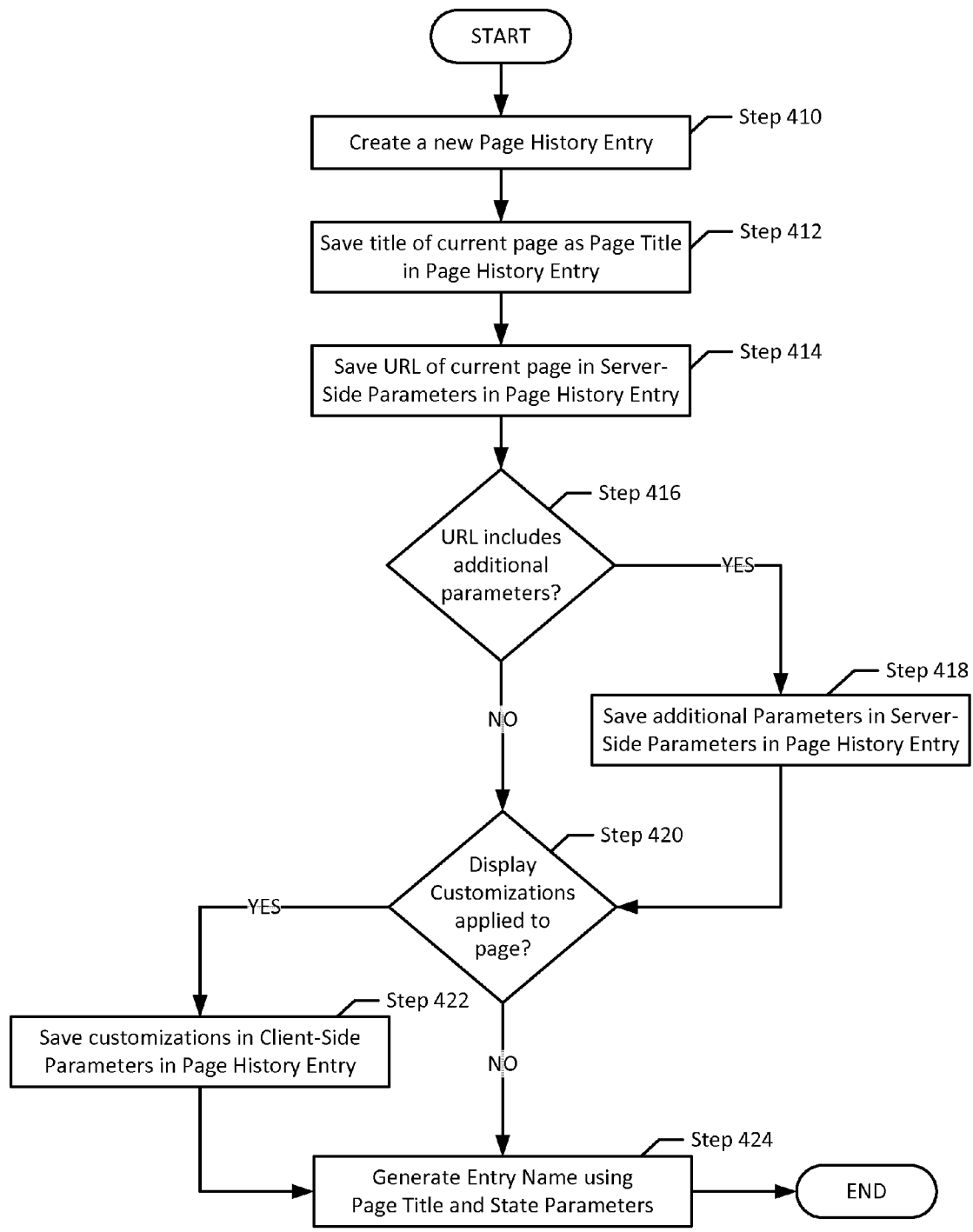
FIG. 4 shows a flow diagram in accordance with one or more embodiments of the invention.

FIG. 4 shows a flowchart for a generating a page history entry in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 410, a new page history entry is created. In Step 412, the title of the current page is retrieved and stored in the page title of the page history entry. In Step 414, the URL of the current page is stored in the server-side parameters of the page history entry. In Step 416, the client application determines whether the URL includes additional parameters. If in Step 416, the client application determines that the URL includes additional parameters, then in Step 418, the additional parameters are stored in the server-side parameters of the page history entry.

In Step 420, the client application determines whether any display customizations have been applied to the current page. If in Step 420, the client application determines that display customizations have been applied to the page, then in Step 422, the customizations are stored in the client-side parameters of the page history entry. If in Step 420, the client application determines that no display customizations have been applied to the page, or once the customizations have been stored, then in Step 424, the entry name is generated using the page title and the state parameters. In one embodiment of the invention, the entry name is displayed to users as an identifier of the page history entry and used to distinguish one page entry from another. In one embodiment of the invention, the entry name also includes state parameters in order to distinguish between page history entries that share the same page title. For example, a page history list may include two page history entries for a page titled "Balance Sheet" with different filtering and sorting parameters applied to the page data. In this example, the entry title for one page history entry may be "Balance Sheet for 2009" and the other entry title may be "Balance Sheet for Toys Department."

Figure 5:
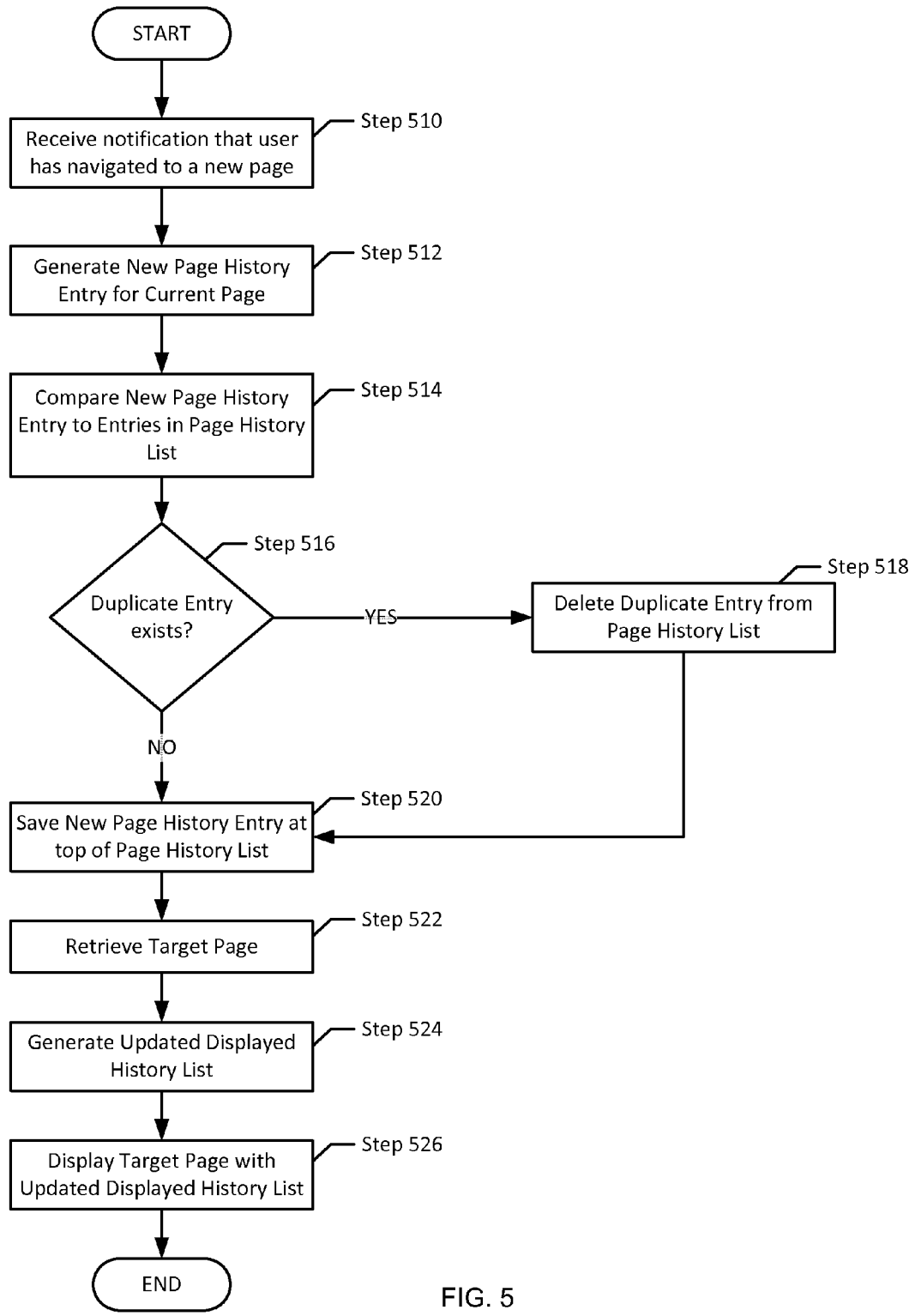
FIG. 5 shows a flow diagram in accordance with one or more embodiments of the invention.

FIG. 5 shows a flowchart for managing a page history list in response to an indication that the user has navigated to a new page in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 510, the client application receives a notification that a user has navigated or intends to navigate to a new page. In one embodiment of the invention, the notification may be input received by the client computer system targeting a portion of the page corresponding to a new page. In one embodiment of the invention, a notification that the user is navigating to a new page also indicates that the user has navigated to a location (i.e., the new page) without requesting an entry in the page history list. In Step 512, the client application generates a new page history entry for the current page (i.e., the page that the user is navigating away from). In one embodiment of the invention, the new page history entry is generated using the process described in FIG. 4.

In Step 514, the new page history entry is compared to the other entries the page history list. In one embodiment of the invention, a user may navigate to a previously visited page and apply the same customizations to that page without invoking the page history entry generated when the user initially visited and customized the page. In such an embodiment, a duplicate entry may be created as a result. Further, in different embodiments of the invention, the circumstances under which two page history entries are determined to be duplicates of one another may differ. Specifically, in one or more embodiments of the invention, two page history entries that share only the same page title may be determined to be duplicates. Alternatively, in one or more embodiments of the invention, two page history entries must be identical to be qualified as duplicates of one another.

In Step 516, the client application determines whether a duplicate entry exists. If the client application determines that a duplicate entry exists, then in Step 518, the page history entry in the page history list is deleted. In one embodiment of the invention, duplicate entries may be deleted to maintain a simplified displayed history list, or a list that maintains previous entries only when significant changes to a loaded page history entry are made. However, in one embodiment of the invention, the duplicate page history entry may not be deleted. In the case where the duplicate entry is not deleted, when the page history list is displayed to the user, it will contain two similar entries which will restore similar or identical pages when targeted by a user. Further, in the case where the duplicate entry is not deleted, the page history list, as displayed to the user, may be representative of a timeline of the pages loaded by the user.

In Step 520, the new page history entry is added to the top of the page history list. In Step 522, the page targeted by the user is retrieved from the server application. In Step 524, the client application generates an updated displayed history list. In one embodiment of the invention, the displayed history list is a list of each entry name corresponding to each page history entry in the page history list. The displayed history list may be presented to a user as part of the interface of the client application. The displayed history list may be presented as part of the current page presented to the user, or may be displayed in a separate portion of the interface. In one embodiment of the invention, changes to the page history list trigger a corresponding change to the displayed history list that reflects the new entry. In Step 526, the targeted page is presented with the updated displayed history list.

Figure 6:
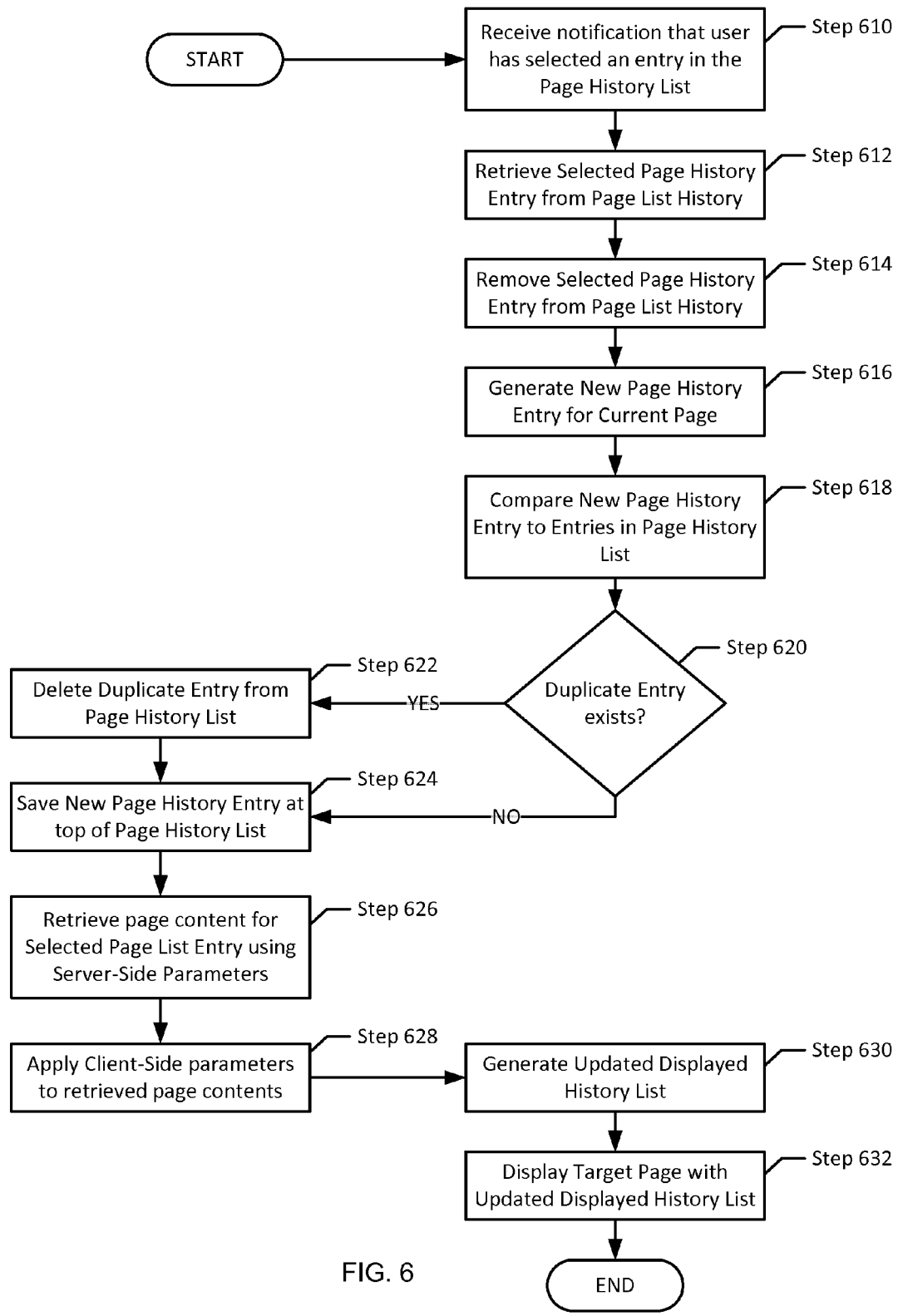
FIG. 6 shows a flow diagram in accordance with one or more embodiments of the invention.

FIG. 6 shows a flowchart for responding to an indication that a user has navigated to a page in the page history list, in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 610, the client application receives a notification that a user has targeted an entry name in the displayed history list. In one embodiment of the invention, the notification may be input received by the client computer system targeting a portion of the page corresponding to an entry name in the displayed history list. In Step 612, the page history entry corresponding to the entry name targeted by the user is retrieved by the client application. In one embodiment of the invention, the targeted page history entry is retrieved by creating a copy of the page history entry in a storage location external to the page history list.

In Step 614, the page history entry retrieved by the client application is removed from the page history list. Alternatively, in one embodiment of the invention, the retrieved page history entry is not removed from the page history list. In the case where the retrieved page history entry is removed, as different pages are navigated between, the displayed history list will appear to move the page history entry to the top of the list each time the page is loaded using the page history entry. In the case where the retrieved entry is not removed, as different pages are navigated between, the displayed history list will display a new page entry name at the top of the list each time a page is loaded using the page history entry, and the previous page history entry will remain at the same relative position in the list.

In Step 616, the client application generates a new page history entry for the current page. In one embodiment of the invention, the new page history entry is generated using the process described in FIG. 4. In Step 618, the new page history entry is compared to the other entries the page history list. In Step 620, the client application determines whether a duplicate entry exists. If the client application determines that a duplicate entry exists, then in Step 622, the page history entry in the page history list is deleted. As discussed above, in one or more embodiments of the invention, the page history entry is not deleted. In Step 624, the new page history entry is added to the top of the page history list.

In Steps 626 and 628, the retrieved page history entry is restored. In Step 626, the server-side parameters from the page history entry are used to request the page content from the server application. In Step 628, the client-side parameters are applied to the page content received from the server application. In Step 630, the client application generates an updated displayed history list based on the page history list. In Step 632, the targeted page is presented with the updated displayed history list.

FIGS. 7-13 show an example in accordance with one or more embodiments of the invention. The example shown in FIGS. 7-13 is for explanatory purposes only and not intended to limit the scope of the invention.

Figure 7A:
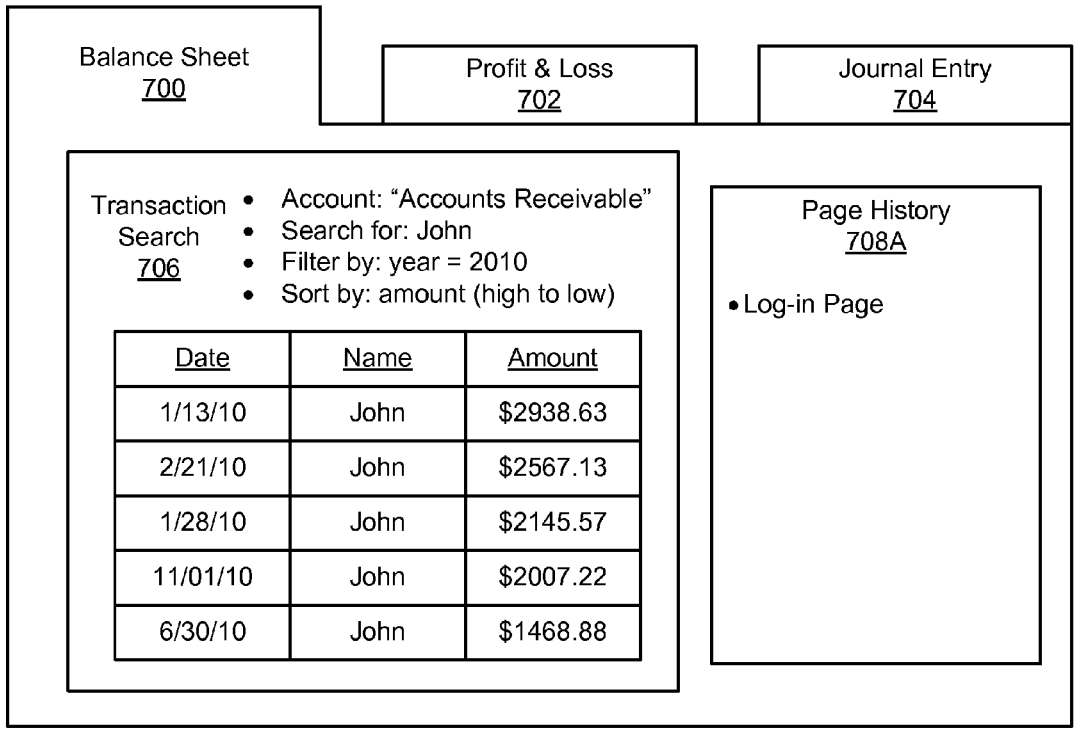
FIGS. 7A-7F show example interfaces in accordance with one or more embodiments of the invention.

FIGS. 7A-7F depict an example client application in accordance with one or more embodiments of the invention. The client application includes three pages: a balance sheet page (700), a profit & loss page (702), and a journal entry page (704). FIG. 7A depicts the balance sheet page (700) that includes a transaction search (706) and displayed page history (708A) with a single page history entry for a log-in page. For the purposes of the example, assume that prior to accessing the page depicted in FIG. 7A, the user accessed the log-in page (not shown). Therefore, FIG. 7A depicts the second page accessed by the user.

Continuing the discussion of FIG. 7A, the transaction search (706) on the balance sheet page (700) has been generated in response to a request for all entries made in the account entitled "Accounts Receivable" that match the search for "John." The results have then been filtered to include only those entries for the year 2010, and the filtered results have been sorted from highest to lowest by the entry amount.

Figure 8:
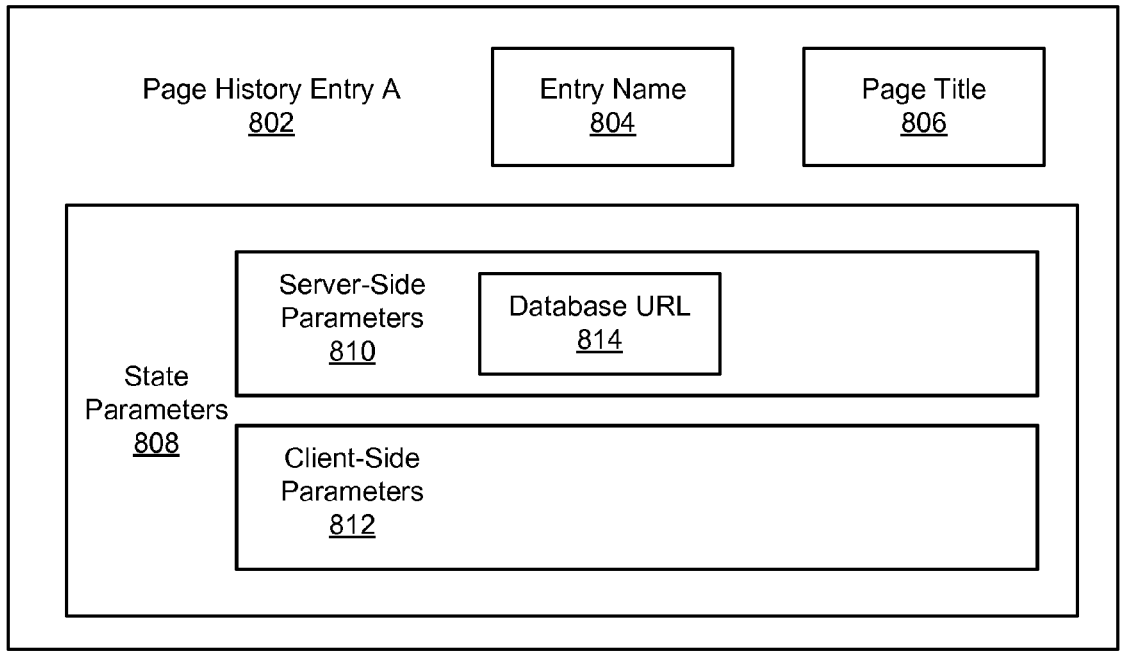
FIGS. 8-13 show example entries in accordance with one or more embodiments of the invention.

FIG. 8 shows an example of a page history entry corresponding to the log-in page entry in page history (708A) in FIG. 7A. The entry name (804) in page history entry A (802) is "Log-in Page." The page title (806) in page history entry A (802) is "Log-in." Within the state parameters (808), the database URL (814) of the log-in page is stored in the server-side parameters (810). There is no data stored in the client-side parameters (812).

Returning to the discussion of FIG. 7A, assume that after the transaction search (706) is presented to the user, the client application is notified that the user attempts to navigate to the profit and loss page (702) by targeting the "Profit & Loss" tab. The client application generates a new page history entry for the current balance sheet page (700). The generated page history entry for the balance sheet page (700) in FIG. 7A is depicted in page history entry B (902) in FIG. 9.

Figure 9:
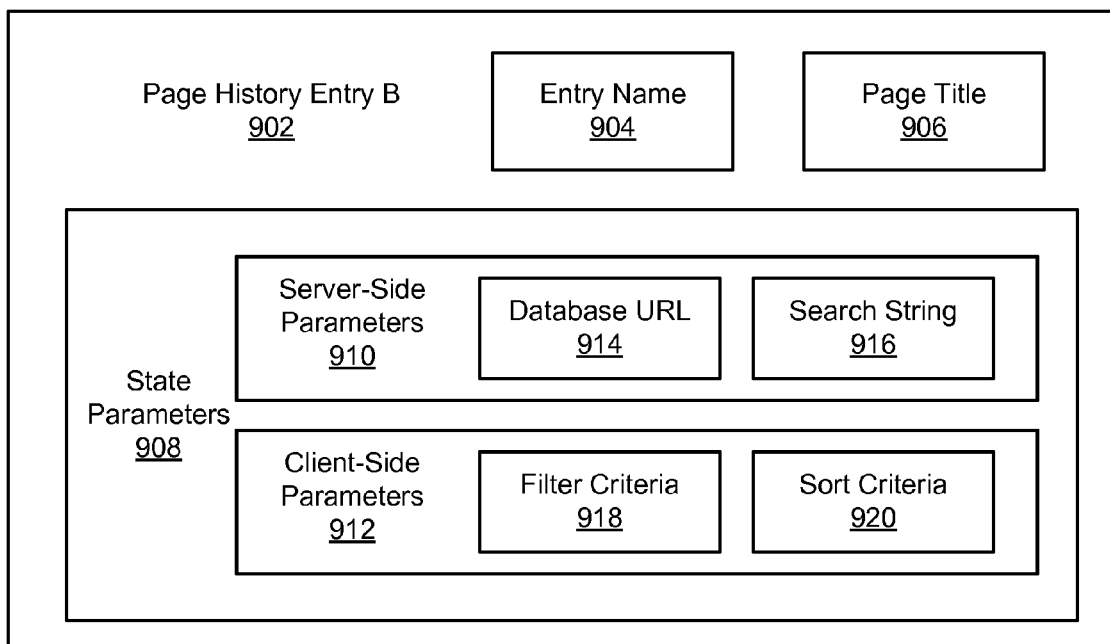

As shown in FIG. 9, the client application has stored "Balance Sheet" in the page title (906). Within the server-side parameters (910) of the state parameters (908), the client application has stored the database URL (914) of "accounts receivable" and "John" has been stored in the search string (916). In the client-side parameters (912), the client application has stored "2010" as filter criteria (918) and amount (high to low) in the sort criteria (920). Finally, the entry name (904) has been generated as "Balance Sheet [John]" using the page title (906) and the search string (916).

Returning to FIG. 7A, once page history entry B (902) is created for the balance sheet page (700) in FIG. 7A, the new page history entry B (902) is compared to the other entries the page history list. The only other entry is page history entry A (802) ("Log-in Page"), and there is no duplicate entry. Page history entry B (902) is added to the top of the page history list. The profit and loss page, targeted by the user, is retrieved from the server application. At this point, the client application generates an updated displayed history list (page history (708B) in FIG. 7B). Finally, the profit and loss page is presented to the user with the updated displayed history list (page history (708B) in FIG. 7B).

Figure 7B:
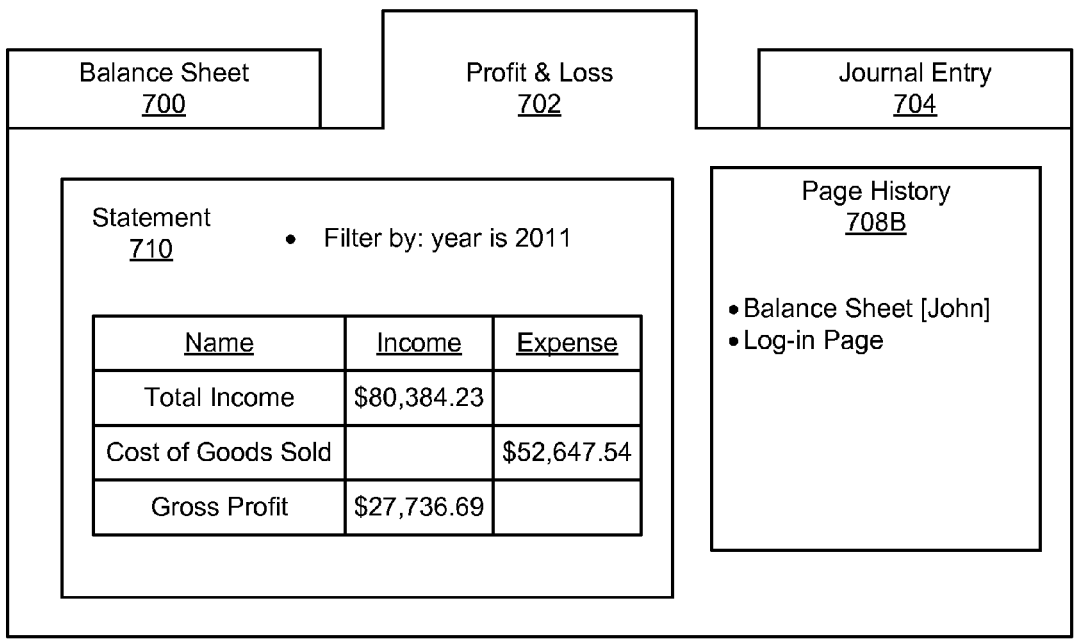

FIG. 7B depicts the profit and loss page (702) that a user navigated to from the balance sheet page (700) depicted in FIG. 7A. As shown in FIG. 7B, the profit and loss page (702) includes page history (708B) corresponding to the page history list. Page history (708B) includes "Balance Sheet [John]" that corresponds to page history entry B (902) followed by "Log-in Page" corresponding to page history entry A (802).

Continuing the discussion of FIG. 7B, assume that the user has requested a profit and loss statement from the server application, and filtered the results to show only results for the year 2011. Assume further that after the statement (710) is presented to the user, the client application is notified that the user attempts to navigate to the journal entry page (704) by targeting the "Journal Entry" tab. In response, the client application generates a new page history entry for the current profit and loss page (702). The generated page history entry for the profit and loss page (702) in FIG. 7B is depicted in page history entry C (1002) in FIG. 10.

Figure 10:
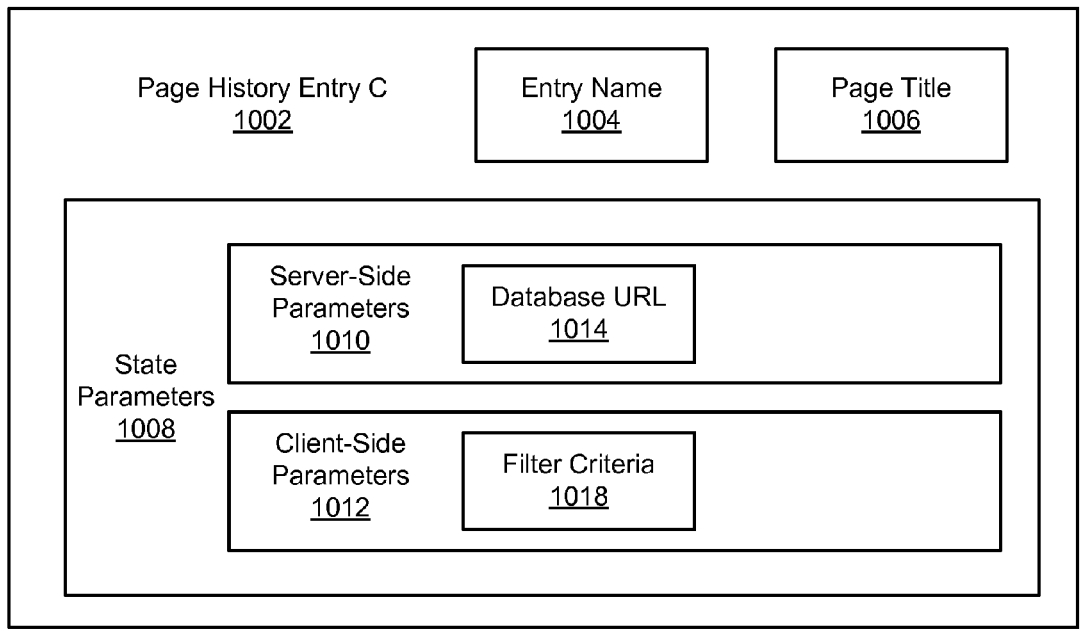

As shown in FIG. 10, the client application has stored "Profit & Loss" in the page title (1006). Within the server-side parameters (1010) of the state parameters (1008), the client application has stored the database URL (1014) of the profit and loss page. In the client-side parameters (1012), the client application has stored "2011" as filter criteria (1018). Finally, the entry name (1004) has been generated as "Profit & Loss [2011]" using the page title (1006) and the filter criteria (1018).

Returning to FIG. 7B, once page history entry C (1002) is created for the profit and loss page (702) in FIG. 7B, the new page history entry C (1002) is compared to the other entries the page history list. The page history list includes page history entry B (902) followed by page history entry A (802). There is no current page entry that is a duplicate of page history entry C (1002). Page history entry C (1002) is added to the top of the page history list. The journal entry page, targeted by the user, is retrieved from the server application. At this point, the client application generates an updated displayed history list (page history (708C) in FIG. 7C). Finally, the journal entry page is presented to the user with the updated displayed history list (page history (708C) in FIG. 7C).

Figure 7C:
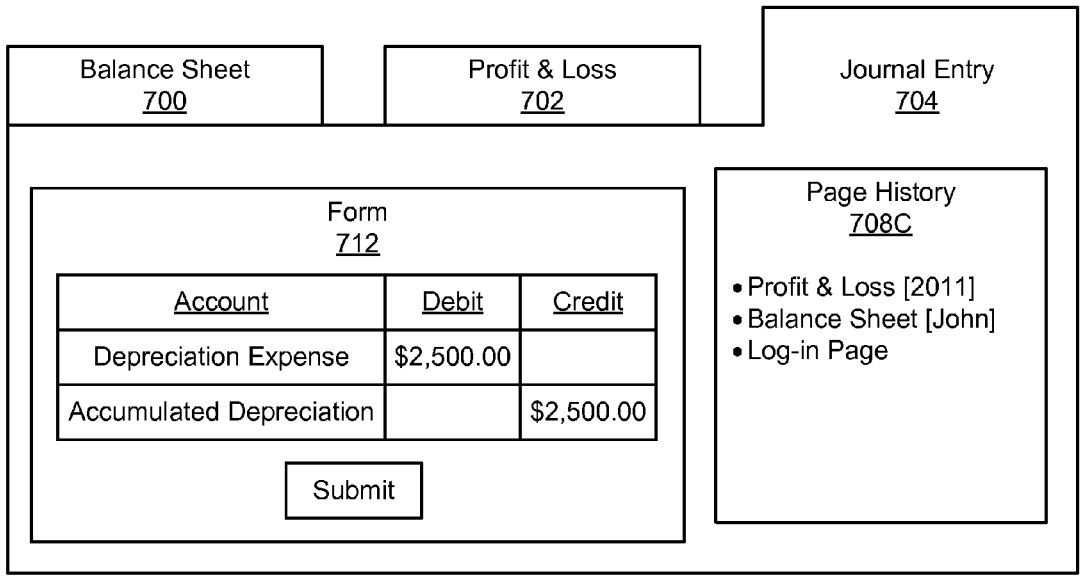

FIG. 7C depicts the journal entry page (704) that a user navigated to from the profit and loss page (702) depicted in FIG. 7B. As shown in FIG. 7C, the journal entry page (704) includes page history (708C) corresponding to the page history list. Page history (708C) includes "Profit & Loss [2011]" that corresponds to page history entry C (1002), "Balance Sheet [John]" that corresponds to page history entry B (902), and "Log-in Page" corresponding to page history entry A (802).

Continuing the discussion of FIG. 7C, assume that the user has requested form (712) from the server application, and entered in a depreciation expense of $2,500, and an accumulated depreciation of $2,500. Assume further that after the user has entered the data, but before the user submits the form to the server application, the client application is notified that the user attempts to navigate to page history entry B (902) by targeting "Balance Sheet [John]" in the page history (708C). In response, page history entry B (902) corresponding to the entry name targeted by the user is copied from the page history list into an external location in the client-side storage. Page history entry B (902) is then removed from the page history list. The client application then generates a new page history entry for the current journal entry page (704). The generated page history entry for the journal entry page (704) in FIG. 7C is depicted in page history entry D (1102) in FIG. 11.

Figure 11:
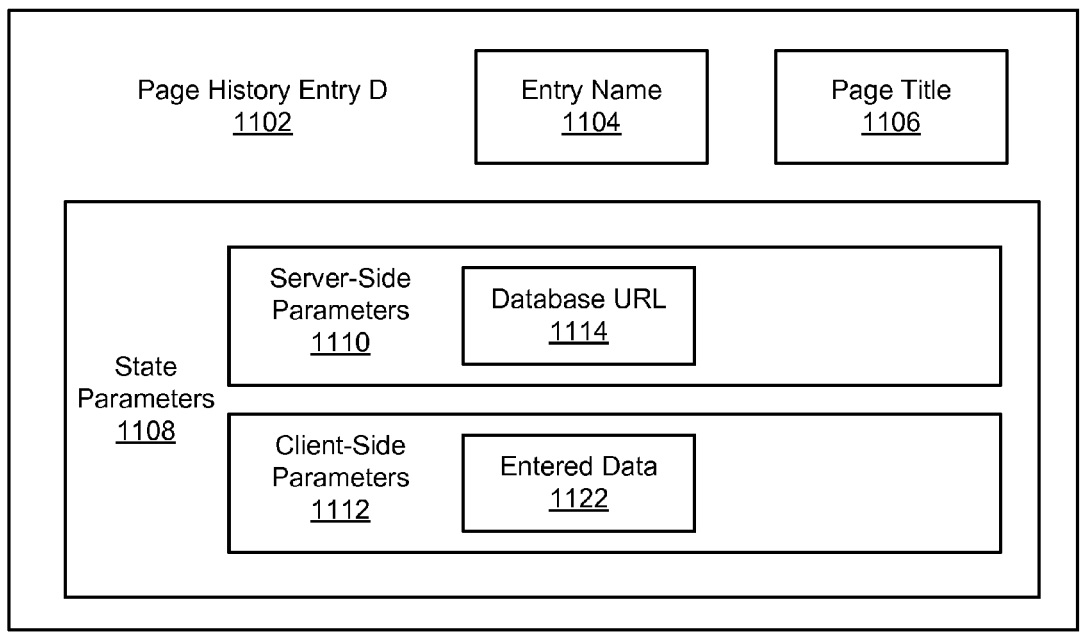

As shown in FIG. 11, the client application has stored "Journal Entry" in the page title (1106). Within the server-side parameters (1110) of the state parameters (1108), the client application has stored the database URL (1114) of the journal entry page. In the client-side parameters (1112), the client application has stored a depreciation expense of $2,500 and an accumulated depreciation of $2,500 as the entered data (1122). Finally, the entry name (1104) has been generated as "Journal Entry [Dep]" using the page title (1106) and the entered data (1122).

Returning to FIG. 7C, once page history entry D (1102) is created for the journal entry page (704) in FIG. 7C, the new page history entry D (1102) is compared to the other entries the page history list. The page history list includes page history entry C (1002), page history entry B (902), and page history entry A (802). There is no current page entry that is a duplicate of page history entry D (1102). Page history entry D (1102) is added to the top of the page history list.

Continuing with the discussion of FIG. 7C, once page history entry D (1102) is added to the top of the page history list, the client application then restores the balance sheet page from page history entry B (902). The client application requests the page content using the database URL (914) and the search string (916). Once the page content is received, the client application applies the filter criteria (918) and the sort criteria (920) to the page content. At this point, the client application generates an updated displayed history list (page history (708D) in FIG. 7D). Finally, the balance sheet page is presented to the user with the updated displayed history list (page history (708D) in FIG. 7D).

Figure 7D:
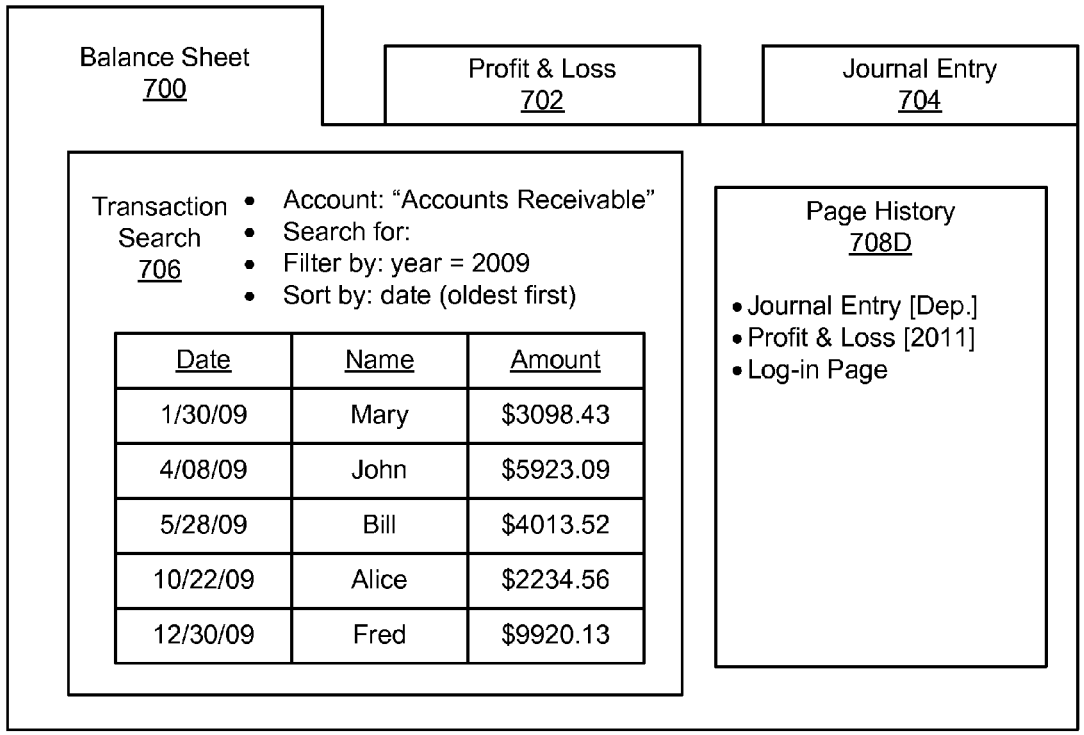

FIG. 7D depicts the balance sheet page (700) that a user navigated to using the "Balance Sheet [John]" entry in page history (708C) in FIG. 7C. As shown in FIG. 7D, the balance sheet page (700) includes page history (708D) corresponding to the page history list. Page history (708D) includes "Journal Entry [Dep.]" that corresponds to page history entry D (1102) "Profit & Loss [2011]" that corresponds to page history entry C (1002), and "Log-in Page" corresponding to page history entry A (802). In one embodiment of the invention, the page history (708D) may be implemented to include the current page (i.e., the page selection made triggering the presentation of the balance sheet page depicted in FIG. 7D). In the current example, such an implementation would result in the page history (708) including "Balance Sheet [John]." However, for the purposes of the current example, "Balance Sheet [John]" is removed (e.g., as in Step 614 of FIG. 6).

Continuing the discussion of FIG. 7D, assume that the user has removed the search criteria from transaction search (706) and resubmitted the report request. Assume also that the new results have been filtered to display only the year 2009, and sorted by date, with the oldest date presented first. Assume further that after the transaction search (706) is presented to the user, the client application is notified that the user attempts to navigate to a new balance sheet page (700) by targeting the "Balance Sheet" tab. In response, the client application generates a new page history entry for the current balance sheet page (700). The generated page history entry for the balance sheet page (700) in FIG. 7D is depicted in page history entry E (1202) in FIG. 12.

Figure 12:
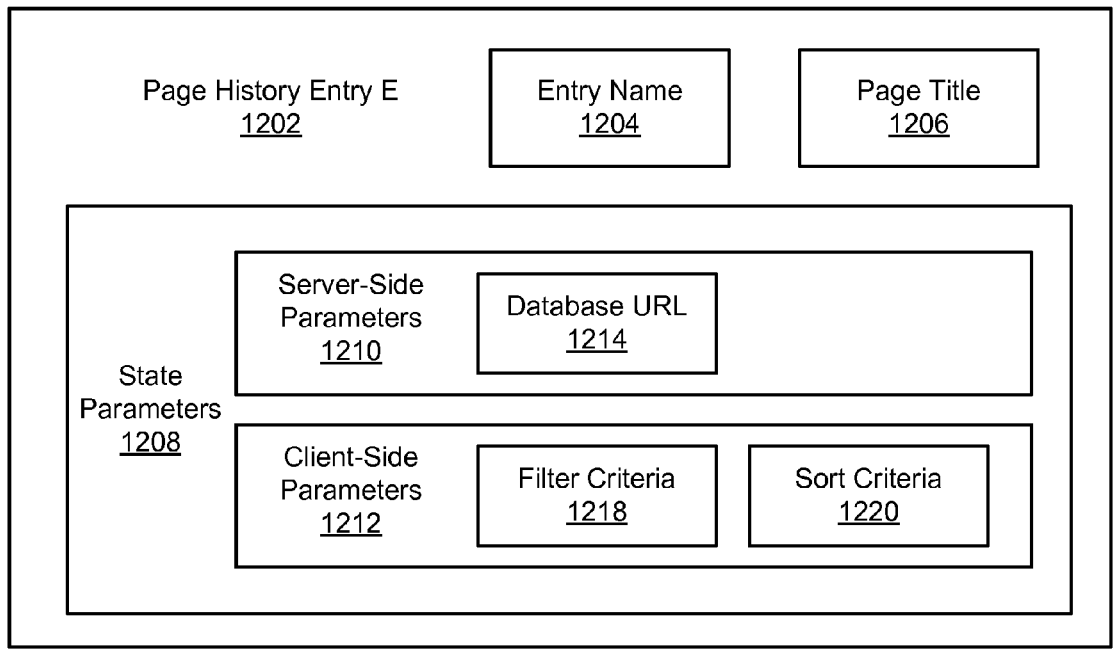

As shown in FIG. 12, the client application has stored "Balance Sheet" in the page title (1206). Within the server-side parameters (1210) of the state parameters (1208), the client application has stored the database URL (1214) of "accounts receivable." In the client-side parameters (1212), the client application has stored "2009" as filter criteria (1218) and date-oldest first in the sort criteria (1220). Finally, the entry name (1204) has been generated as "Balance Sheet [2009]" using the page title (1206) and the filter criteria (1218).

Returning to FIG. 7D, once page history entry E (1202) is created for the balance sheet page (700) in FIG. 7D, the new page history entry D (1202) is compared to the other entries the page history list. The page history list includes page history entry D (1102), page history entry C (1002), and page history entry A (802). There is no current page entry that is a duplicate of page history entry E (1202). Page history entry E (1202) is added to the top of the page history list. The new balance sheet page, targeted by the user, is retrieved from the server application. At this point, the client application generates an updated displayed history list (page history (708E) in FIG. 7E). Finally, the new balance sheet page is presented to the user with the updated displayed history list (page history (708E) in FIG. 7E).

Figure 7E:
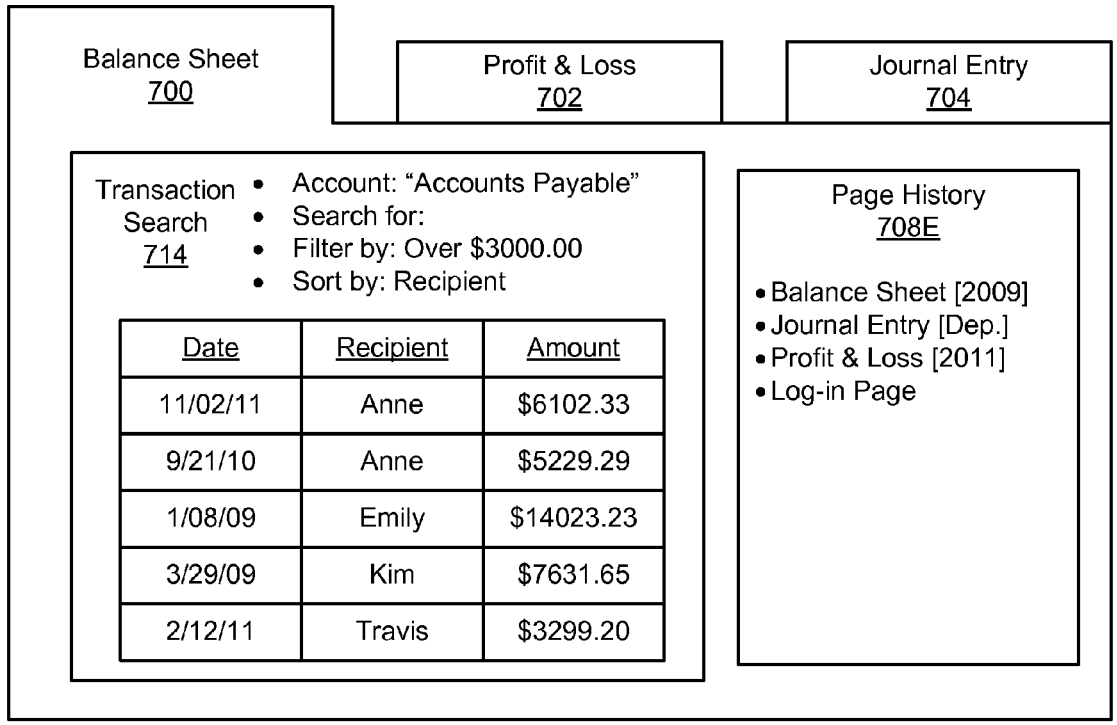
Figure 7F:
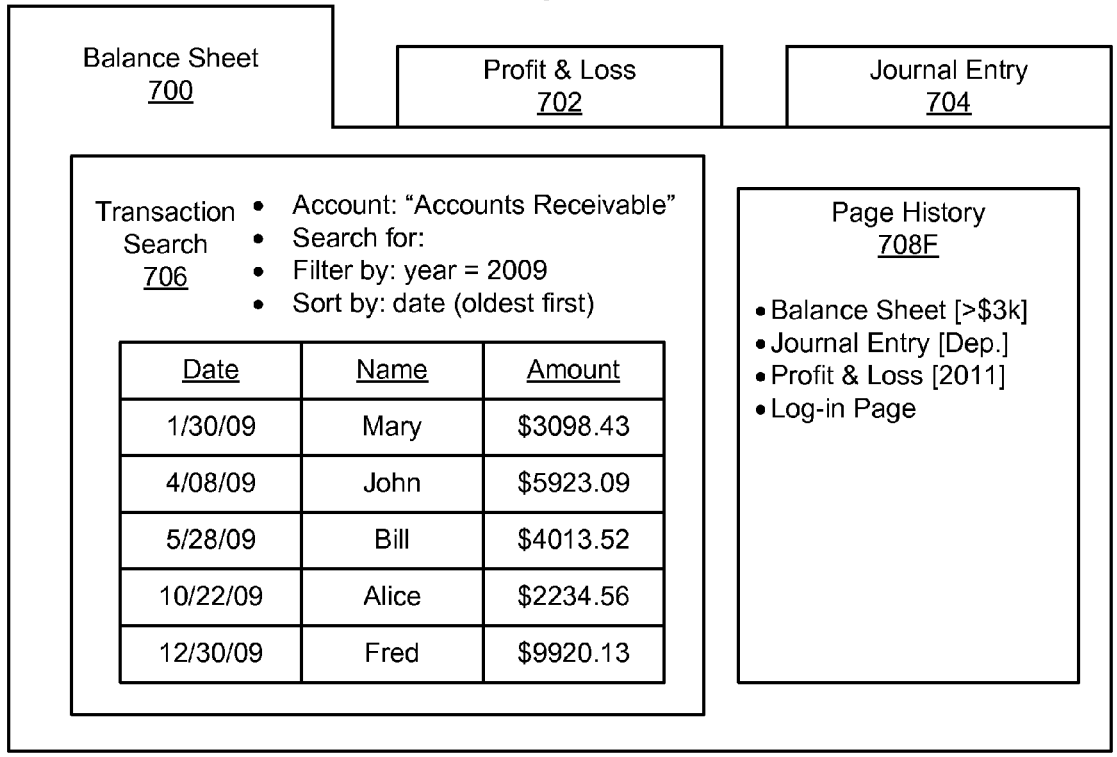

FIG. 7E depicts the balance sheet page (700) that a user navigated to by targeting the Balance Sheet tab and subsequently altered as depicted in FIG. 7D. As shown in FIG. 7E, the balance sheet page (700) includes page history (708E) corresponding to the page history list. Page history (708E) includes "Balance Sheet [2009]" that corresponds to page history entry D (1202), "Journal Entry [Dep.]" that corresponds to page history entry D (1102) "Profit & Loss [2011]"

that corresponds to page history entry C (1002), and "Log-in Page" corresponding to page history entry A (802).

Continuing the discussion of FIG. 7E, assume that the user has been presented with transaction search (714) in response to a request for all entries in the account "accounts payable" from the server application. The user has then filtered the report to display only those entries with amounts exceeding $3,000, and sorted the remaining entries by recipient. Assume further that after the user is presented with transaction search (714), that the client application is notified that the user attempts to navigate to page history entry E (1202) by targeting "Balance Sheet [2009]" in the page history (708E). Page history entry E (1202) corresponding to the entry name targeted by the user is copied from the page history list into an external location in the client-side storage. Page history entry E (1202) is then removed from the page history list. The client application then generates a new page history entry for the current balance sheet page (700). The generated page history entry for the balance sheet page (700) in FIG. 7E is depicted in page history entry F (1302) in FIG. 13.

Figure 13:
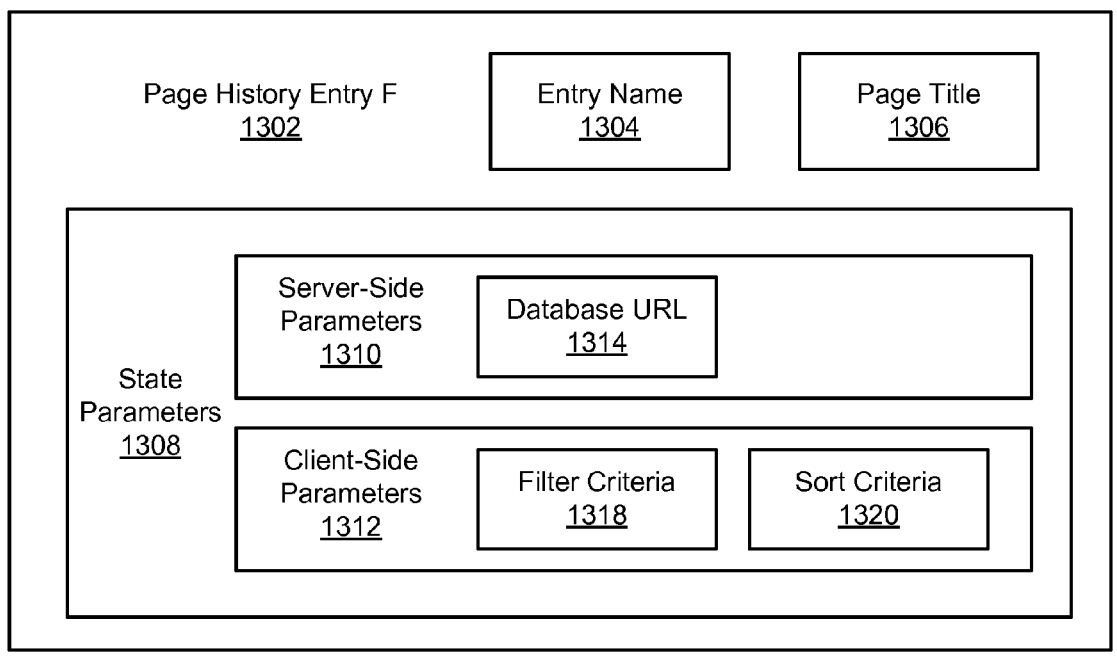

As shown in FIG. 13, the client application has stored "Balance Sheet" in the page title (1306). Within the server-side parameters (1310) of the state parameters (1308), the client application has stored the database URL (1314) of "accounts payable." In the client-side parameters (1312), the client application has stored "over $3,000" as filter criteria (1318) and recipient in the sort criteria (1320). Finally, the entry name (1304) has been generated as "Balance Sheet [>$3k]" using the page title (1306) and the filter criteria (1318).

Returning to FIG. 7E, once page history entry F (1302) is created for the balance sheet page (700) in FIG. 7E, the new page history entry F (1302) is compared to the other entries the page history list. The page history list includes page history entry D (1102), page history entry C (1002), and page history entry A (802). There is no current page entry that is a duplicate of page history entry F (1302). Page history entry F (1302) is added to the top of the page history list.

Continuing with the discussion of FIG. 7E, once page history entry F (1302) is added to the top of the page history list, the client application then restores the balance sheet page from page history entry E (1202). The client application requests the page content using the database URL (1214) and the search string (1216). Once the page content is received, the client application applies the filter criteria (1218) and the sort criteria (1220) to the page content. At this point, the client application generates an updated displayed history list (page history (708F) in FIG. 7F). Finally, the balance sheet page is presented to the user with the updated displayed history list (page history (708F) in FIG. 7F).

Figure 14:
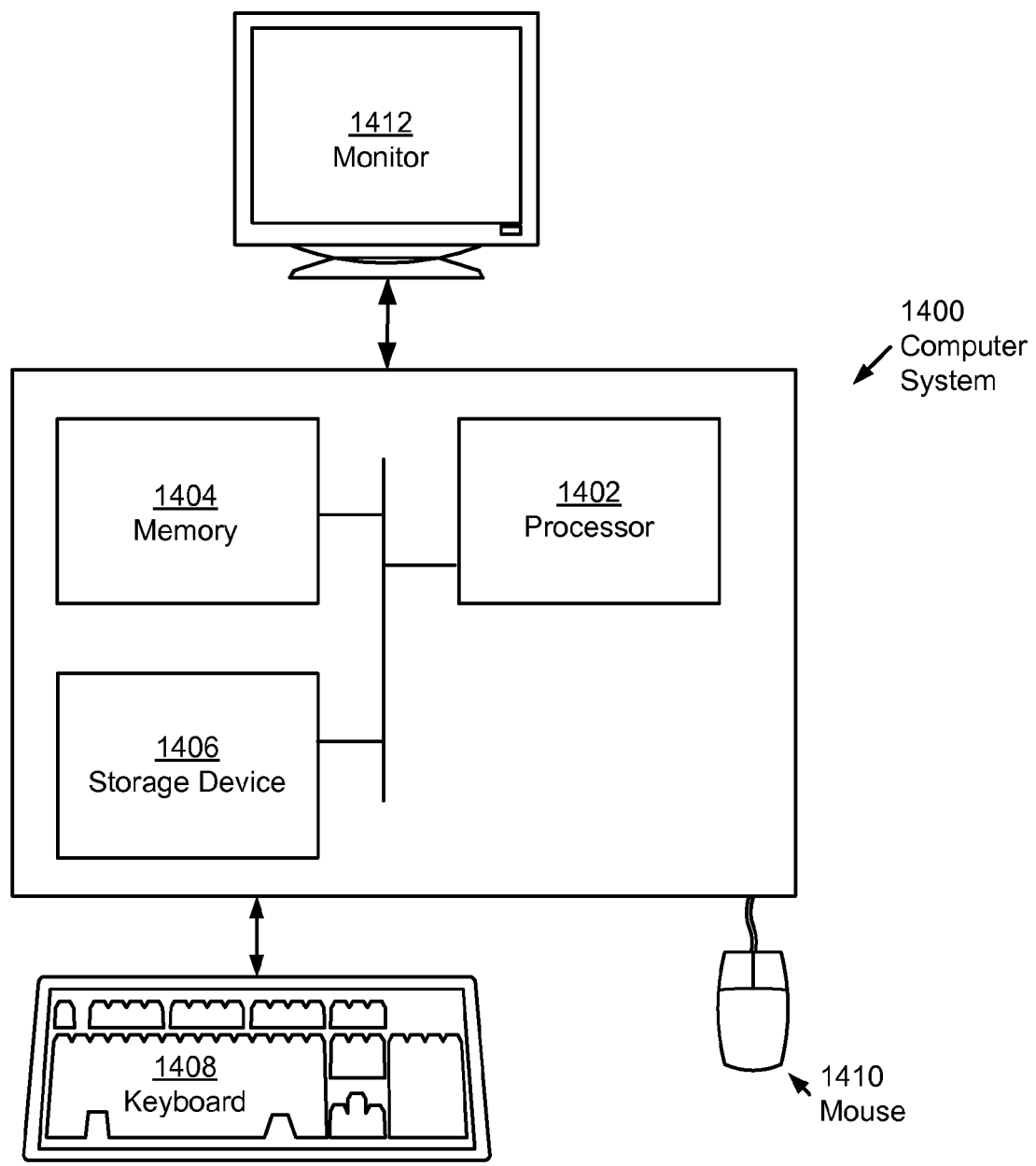
FIG. 14 shows a computer system in accordance with one or more embodiments of the invention.

Embodiments of the invention may be implemented on virtually any type of computer regardless of the platform being used. For example, as shown in FIG. 14, a computer system (1400) includes one or more processor(s) (1402) such as a central processing unit (CPU) or other hardware processor(s), associated memory (1404) (e.g., random access memory (RAM), cache memory, flash memory, etc.), a storage device (1406) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (1402) is hardware. For example, the processor may be an integrated circuit. The computer system (1400) may also include input means, such as a keyboard (1408), a mouse (1410), or a microphone (not shown). Further, the computer system (1400) may include output means, such as a monitor (1412) (e.g., a liquid crystal display (LCD), a plasma display, or cathode ray tube (CRT) monitor). The computer system (1400) may be connected to a network (not shown) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (1400) includes at least the minimal processing, input, and/or output means necessary to practice embodiments of the invention.

Further, those skilled in the art will appreciate that one or more elements of the aforementioned computer system (1400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A system comprising:
 a client-side storage configured to store:
  a first page history entry comprising a first resource location and a first client-side parameter;
 a processor; and
 a client application, executing on the processor, configured to:
  display, to a user, a first page comprising first resource data;
  receive, from the user, a first customization of the first resource data in the first page;
  display, to the user, reformed first resource data comprising the first resource data customized according to the first customization;
  capture the first customization as the first client-side parameter;
  generate the first page history entry comprising the first resource location and the first client-side parameter;
  display, to a user, a second page comprising second resource data from a second resource location and a page history list listing an identifier of the first page history entry, wherein the second resource data is customized according to a second client-side parameter;

receive, from the user, input targeting the identifier of the first page history entry;

obtain, from the client-side memory, the first page history entry corresponding to the identifier;

generate a second page history entry comprising the second resource location and the second client-side parameter;

store the second page history entry in the client-side memory;

send, to a server application, a request comprising the first resource location retrieved from the first page history entry;

receive the first resource data from the server application in response to the request;

apply the first client-side parameter to the first resource data to obtain the reformed first resource data; and generate the first page comprising the reformed first resource data and the page history list listing an identifier of the second page history entry.

2. The system of claim 1, wherein the client application is further configured to:

display, to the user, the first page after generating the first page;

receive, from the user, a second customization of the first resource data in the first page;

capture the second customization as a third client-side parameter;

obtain, from the client-side memory, the second page history entry in response to input targeting an identifier of the second page history entry;

generate a third page history entry comprising the first resource location and the third client-side parameter;

store the third page history entry in the client-side memory;

send, to the server application, a request comprising the second resource location retrieved from the second page history entry;

receive second resource data from the server application in response to the request;

apply the second client-side parameter to the second resource data to obtain reformed second resource data; and generate a third page comprising the reformed second resource data and the page history list listing an identifier of the third page history entry.

3. The system of claim 1, wherein the first resource location is a first network address, and the second resource location is a second network address.

4. The system of claim 1, wherein the first client-side parameter comprises an instruction to filter the resource data by a filter term.

5. The system of claim 1, wherein the identifier of the first page history entry comprises a title of the first page.

6. The system of claim 1, wherein the client application is a financial application.

7. The system of claim 1, wherein the first page is a balance sheet comprising credits and debits applied to a business account.

8. A method for tracking a navigation path comprising:

displaying, to a user, a first page comprising first resource data located at a first resource location;

receiving, from the user, a first customization of the first resource data in the first page;

displaying, to the user, reformed first resource data comprising the first resource data customized according to the first customization;

capturing, by a client application executing on a processor, the first customization as a first client-side parameter;

generating the first page history entry comprising the first resource location and the first client-side parameter;

displaying, by the client application executing on a processor, a second page comprising second resource data from a second resource location and a page history list listing an identifier of a first page history entry, the second resource data is customized according to a second client side parameter;

receiving, by the client application executing on the processor, input targeting the identifier of the first page history entry;

obtaining, from a page history list, the first page history entry corresponding to the identifier;

generating, by the client application executing on the processor, a second page history entry comprising the second resource location and the second client-side parameter;

storing the second page history entry in the page history list;

sending, to a server application, a request comprising the first resource location retrieved from the first page history entry;

receiving, by the client application executing on the processor, the first resource data from the server application in response to the request;

applying the first client-side parameter to the first resource data to obtain reformed resource data; and generating, by the client application executing on the processor, the first page comprising the reformed resource data and the page history list listing an identifier of the second page history entry.

9. The method of claim 8, further comprising:

displaying, to the user, the first page after generating the first page;

receiving, from the user, a second customization of the first resource data in the first page;

capturing the second customization as a third client-side parameter;

obtaining the second page history entry in response to input targeting an identifier of the second page history entry;

generating a third page history entry comprising the first resource location and the third client-side parameter;

storing the third page history entry in the page history list;

sending, to the server application, a request comprising the second resource location retrieved from the second page history entry;

receiving second resource data from the server application in response to the request;

applying the second client-side parameter to the second resource data to obtain reformed second resource data; and generating a third page comprising the reformed second resource data and the page history list listing an identifier of the third page history entry.

10. The method of claim 8, wherein the first resource location is a first network address, and the second resource location is a second network address.

11. The method of claim 8, wherein the first client-side parameter comprises an instruction to filter the resource data by a filter term.

12. The method of claim 8, wherein the identifier of the first page history entry comprises a title of the first page.

13. The method of claim 8, wherein the client application is a financial application.

14. The method of claim 8, wherein the first page is a balance sheet comprising credits and debits applied to a business account.

15. A non-transitory computer-readable storage medium comprising instructions that, when executed by a processor, perform:
- displaying, to a user, a first page comprising first resource data located at a first resource location;
- receiving, from the user, a first customization of the first resource data in the first page;
- displaying, to the user, reformed first resource data comprising the first resource data customized according to the first customization;
- capturing, by a client application executing on a processor, the first customization as a first client-side parameter;
- generating the first page history entry comprising the first resource location and the first client-side parameter;
- displaying, by a client application, a second page comprising second resource data from a second resource location and a page history list listing an identifier of a first page history entry, the second resource data is customized according to a second client side parameter;
- receiving, by the client application, input targeting the identifier of the first page history entry;
- obtaining, from a page history list, the first page history entry corresponding to the identifier;
- generating, by the client application, a second page history entry comprising the second resource location and the second client-side parameter;
- storing the second page history entry in the page history list;
- sending, to a server application, a request comprising the first resource location retrieved from the first page history entry;
- receiving, by the client application, the first resource data from the server application in response to the request;
- applying the first client-side parameter to the first resource data to obtain reformed resource data; and
- generating, by the client application, the first page comprising the reformed resource data and the page history list listing an identifier of the second page history entry.

16. The non-transitory computer-readable storage medium of claim 15, further comprising instructions that perform:
- displaying, to the user, the first page after generating the first page;
- receiving, from the user, a second customization of the first resource data in the first page;
- capturing the second customization as a third client-side parameter;
- obtaining the second page history entry in response to input targeting an identifier of the second page history entry;
- generating a third page history entry comprising the first resource location and the third client-side parameter;
- storing the third page history entry in the page history list;
- sending, to the server application, a request comprising the second resource location retrieved from the second page history entry;
- receiving second resource data from the server application in response to the request;
- applying the second client-side parameter to the second resource data to obtain reformed second resource data; and
- generating a third page comprising the reformed second resource data and the page history list listing an identifier of the third page history entry.

17. The non-transitory computer-readable storage medium of claim 15, wherein the first resource location is a first network address, and the second resource location is a second network address.

18. The non-transitory computer-readable storage medium of claim 15, wherein the first client-side parameter comprises an instruction to filter the resource data by a filter term.

19. The non-transitory computer-readable storage medium of claim 15, wherein the client application is a financial application.

20. The non-transitory computer-readable storage medium of claim 15, wherein the first page is a balance sheet comprising credits and debits applied to a business account.

* * * * *